US012155159B1

(12) United States Patent
Liang

(10) Patent No.: US 12,155,159 B1
(45) Date of Patent: Nov. 26, 2024

(54) DETACHABLE EXTENSION SOCKET ASSEMBLY

(71) Applicant: Can Liang, Shenzhen (CN)

(72) Inventor: Can Liang, Shenzhen (CN)

( * ) Notice: Subject to any disclaimer, the term of this patent is extended or adjusted under 35 U.S.C. 154(b) by 0 days.

(21) Appl. No.: 18/607,792

(22) Filed: Mar. 18, 2024

(30) Foreign Application Priority Data

Mar. 4, 2024 (CN) ......................... 202420418634.8

(51) Int. Cl.
*H05K 5/00* (2006.01)
*H01R 13/508* (2006.01)
*H01R 13/74* (2006.01)
*H01R 25/00* (2006.01)

(52) U.S. Cl.
CPC ......... *H01R 13/748* (2013.01); *H01R 13/508* (2013.01); *H01R 25/006* (2013.01)

(58) Field of Classification Search
USPC ................................ 361/728, 759, 801, 803
See application file for complete search history.

(56) References Cited

U.S. PATENT DOCUMENTS

2020/0106250 A1 * 4/2020 Jackson .................. H02G 3/14

FOREIGN PATENT DOCUMENTS

CN 209913168 U * 1/2020 ............ H01R 13/73
CN 215067459 U * 12/2021 ............... G02B 6/44

* cited by examiner

*Primary Examiner* — Hung S. Bui

(57) ABSTRACT

A detachable extension socket assembly includes an extension socket body and a frame. The frame is configured for fixing to an external component. The frame is provided with a perforating hole. The extension socket body is equipped with a position limiting part. The extension socket body at least partially passes through the perforating hole. The position limiting part abuts against the frame. In the present invention, the frame is configured for fixing to a table, and the extension socket body is detachably connected to the frame. Therefore, when the extension socket body is needed in other positions, the extension socket body can be separated from the frame, facilitating movement of the extension socket body, and solving the existing problems that installing the extension socket on a wooden table with screws can easily cause the table to crack around the screws and the installation is cumbersome.

18 Claims, 8 Drawing Sheets

DETACHABLE EXTENSION SOCKET ASSEMBLY

CROSS-REFERENCE TO RELATED APPLICATIONS

The application claims priority of Chinese patent application CN202420418634.8, filed on Mar. 4, 2024, which is incorporated herein by reference in its entireties.

TECHNICAL FIELD

The present invention relates to a technical field of extension sockets, in particular to a detachable extension socket assembly.

BACKGROUND ART

As is well known, an extension socket is a movable multi-opening socket with a power cord and a plug. With the increase of electronic products in daily life, and in order to facilitate the use of electronic products on a desktop, an existing table will be equipped with the extension socket. But currently, in the existing extension socket fixed to a surface of the table through embedding, panels protrude from two sides of the extension socket, and the panels are fixed to the table by screws. However, this method of fixing the extension socket with screws can easily cause the table to crack on sides around the screws. When the extension socket is moved or reinstalled, the screws are repeatedly tightened and removed, which is more likely to cause the table to crack on the sides around the screws. Moreover, using screws to fix the extension socket on the table requires the use of tools, which is cumbersome to operate.

SUMMARY

A main purpose of the present invention is to provide a detachable extension socket assembly for solving the problems that installing the existing extension socket body on a wooden table with screws can easily cause the wooden table to crack and the installation is cumbersome.

In order to solve the above-mentioned technical problems, a technical solution is provided by the present invention.

A detachable extension socket assembly includes an extension socket body and a frame. The frame is configured for fixing to an external component.

A perforating hole is provided on the frame, and a position limiting part is arranged on the extension socket body. At least one part of the extension socket body passes through the perforating hole, and the position limiting part is used for abutting against the frame. The extension socket body is detachably connected to the frame.

Furthermore, a first convex block is provided on one side wall of the extension socket body, and the extension socket body is equipped with a buckle structure between one side or one end away from the first convex block and the frame.

When the extension socket body is assembled with the frame, the extension socket body is connected to the frame through the buckle structure on the side or the end away from the first convex block, and the first convex block is positioned at a bottom of the frame.

Furthermore, the buckle structure includes a movable block movably arranged on the extension socket body.

When the extension socket body is assembled with the frame, the movable block moves relative to the extension socket body under the action of an external force, and at least one part of the movable block is positioned below the frame.

Furthermore, when the extension socket body is assembled with the frame, a first position limiting opening is defined between at least one part of the movable block and the position limiting part. Part of the frame is placed inside the first position limiting opening.

Furthermore, the first convex block is positioned below the position limiting part, and a second position limiting opening is defined between the first convex block and the position limiting part.

When the extension socket body is assembled with the frame, part of the frame is placed inside the second position limiting opening.

Furthermore, a reinforcing rib is provided at a bottom of the first convex block, and one side of the reinforcing rib is connected to a side wall of the extension socket body.

Furthermore, the extension socket body is provided with an installation chamber at one end away from the first convex block, and at least one part of the movable block is movably arranged within the installation chamber. A joint structure is provided between a bottom surface of the installation chamber and the movable block.

The joint structure includes a second convex block and a plurality of fixed slots adapted to the second convex block for use. The plurality of fixed slots are distributed along a direction of movement of the movable block, and the fixed slots are used in conjunction with the second convex block during the movement of the movable block.

Furthermore, two opposite side walls of the second convex block are both first inclined guiding surfaces. The first inclined guiding surfaces are inclined planes or curved planes. The second convex block fits the fixed slots.

Furthermore, the second convex block is positioned on a bottom surface of the installation chamber, and the fixed slots are positioned at a bottom of the movable block.

The bottom surface of the installation chamber is equipped with a U-shaped gap, and an elastic sheet is provided in a middle of the U-shaped gap. The second convex block is positioned on the elastic sheet.

Furthermore, the second convex block is positioned at one end of the elastic sheet away from the first convex block.

Furthermore, the installation chamber is provided with a first opening on one side away from the first convex block. An upper surface of the extension socket body is provided with a second opening in communication with the installation chamber. A top of the movable block is provided with a toggle block, and the toggle block is at least partially placed at the first opening. Furthermore, at least one anti-slip groove is provided at a top of the toggle block.

Furthermore, the position limiting part is arranged around a peripheral side of the extension socket body.

Furthermore, a total number of the position limiting parts is at least two, and at least two position limiting parts are respectively positioned above the first convex block and the movable block.

Furthermore, the extension socket body includes a bottom shell and a front shell. The installation chamber and the first opening are formed by connecting the bottom shell to the front shell. The second opening and the position limiting part are both positioned on the front shell. The first convex block, the reinforcing rib, the elastic sheet, and the second convex block are all positioned on the bottom shell.

Furthermore, the first convex block, the reinforcing rib, the elastic sheet, the second convex block and the bottom shell are all integrally formed by injection molding.

Furthermore, an upper surface of the frame is provided with an accommodating slot at a position corresponding to the position limiting part. When the extension socket body is assembled with the frame, the position limiting part is placed in the accommodating slot.

Furthermore, when the extension socket body is assembled with the frame, an upper surface of the frame and an upper surface of the extension socket body are on an identical plane or in smooth transition.

Furthermore, the extension socket body is equipped with a plurality of jacks for connecting to external devices. The jacks are three-hole jacks, two-hole jacks, and/or USB interfaces. The jacks are national standard jacks, American standard jacks, European standard jacks, and/or British standard jacks. The USB interfaces are USB-A interfaces, USB-C interfaces, lightning interfaces, and/or Micro USB interfaces.

Furthermore, the jacks include USB interfaces and three-hole jacks. The extension socket body further includes a power cord and electrical connection sheets electrically connected to the power cord. The electrical connection sheets are arranged in positions corresponding to the three-hole jacks, and the power cord is also electrically connected to the USB interfaces.

Compared to existing technology, in the present invention, the frame is configured for fixing to a table, and the extension socket body is detachably connected to the frame. Therefore, when the extension socket body is needed in other positions, the extension socket body can be separated from the frame, facilitating movement of the extension socket body, and solving the existing problems that installing the extension socket on a wooden table with screws can easily cause the table to crack around the screws and the installation is cumbersome.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
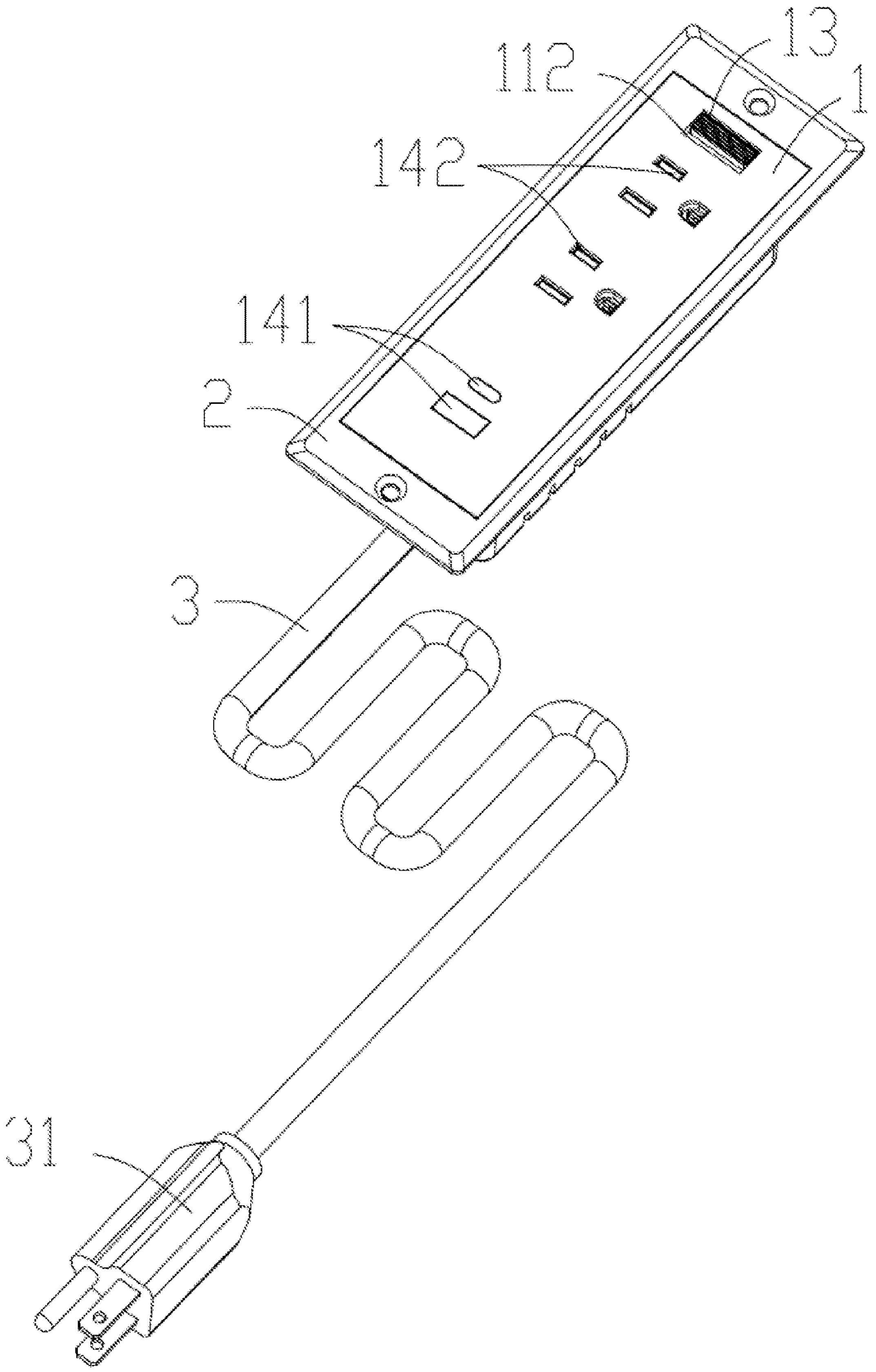
FIG. 1 is a perspective view according to the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
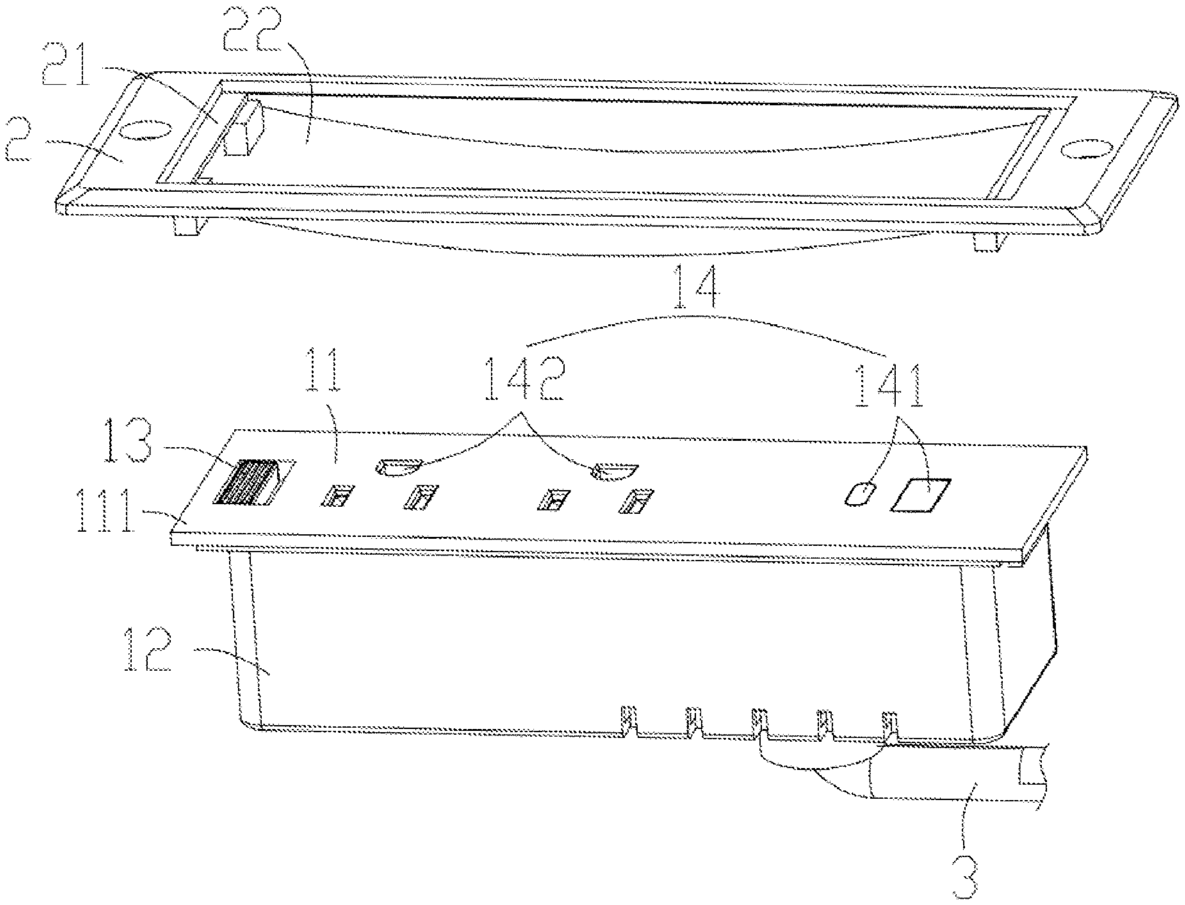
FIG. 2 is an exploded view of an extension socket body and a frame according to the present invention.
Figure 3:
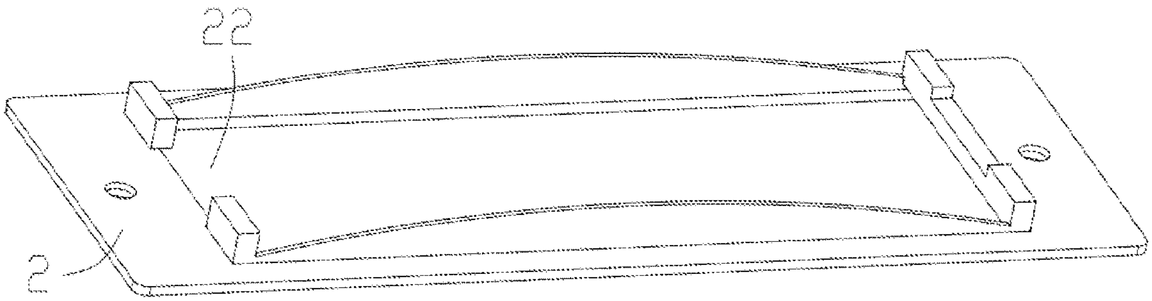
FIG. 3 is a structural diagram of a frame according to the present invention.
Figure 4:
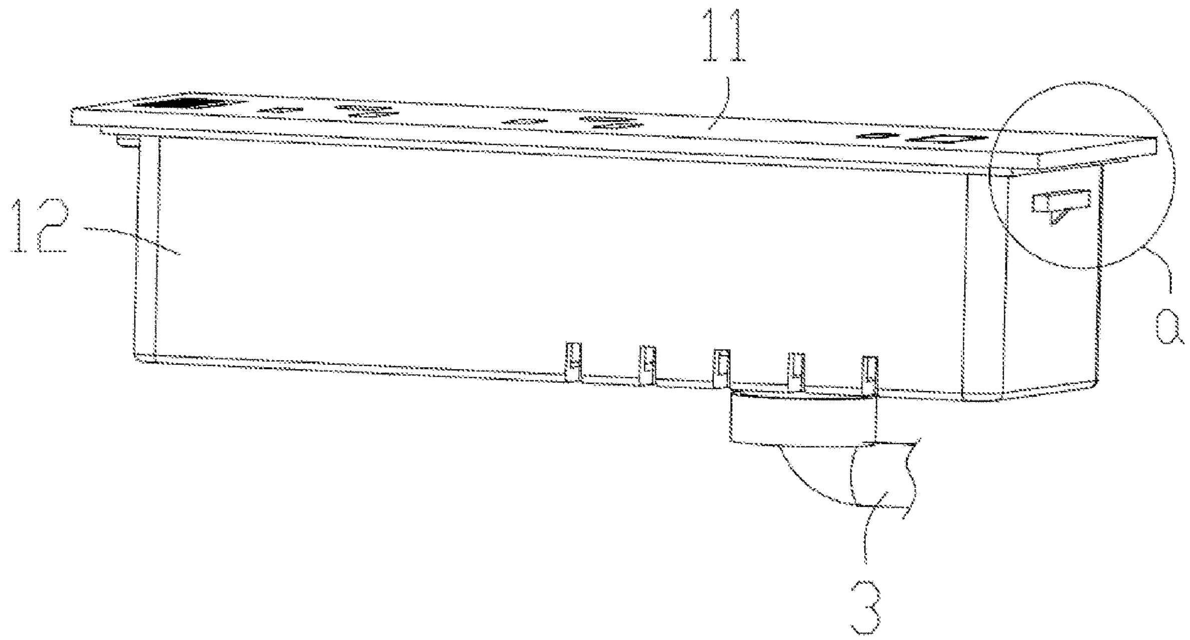
FIG. 4 is a perspective view of an extension socket body according to the present invention.
Figure 5:
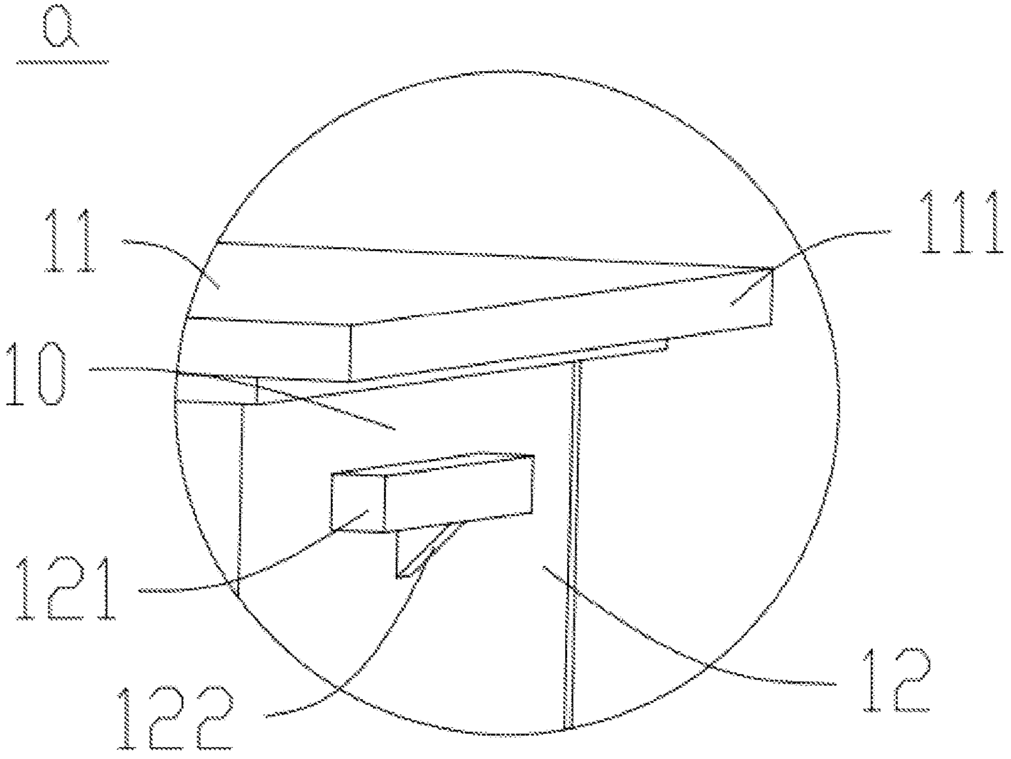
FIG. 5 is an enlarged view of area a in FIG. 4.
Figure 6:
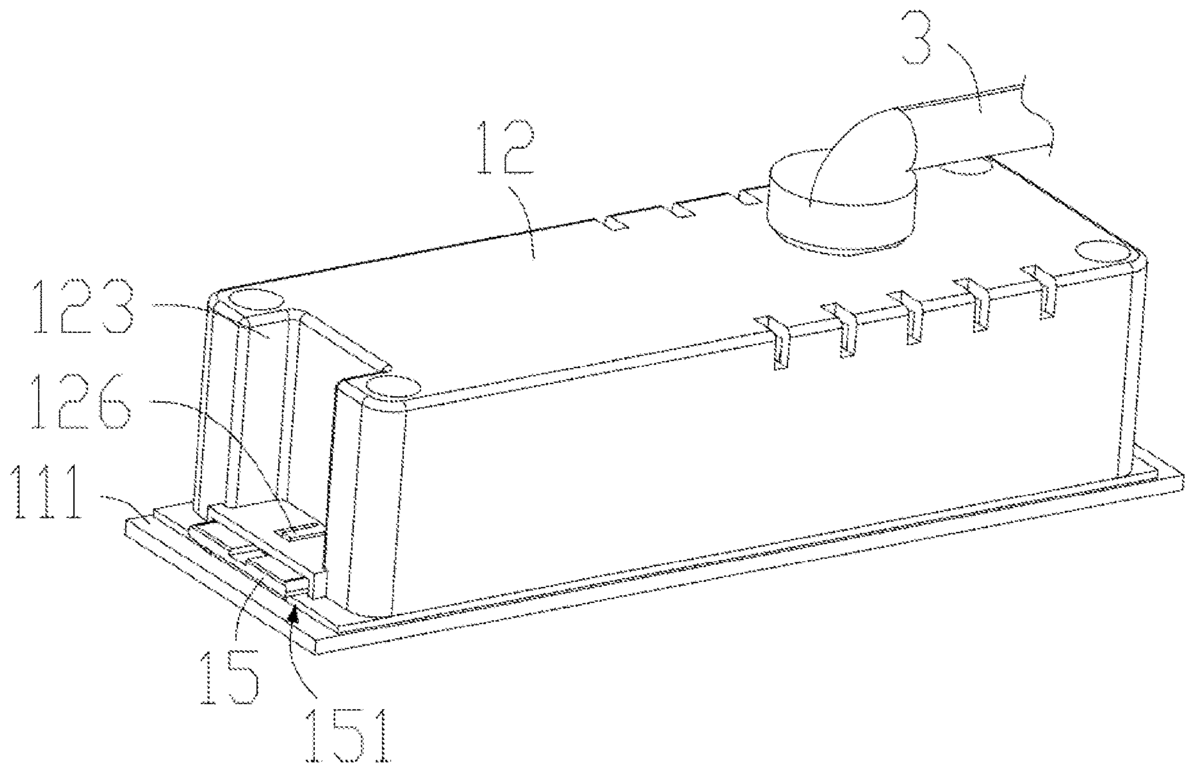
FIG. 6 is a perspective view of an extension socket body from another perspective according to the present invention.
Figure 7:
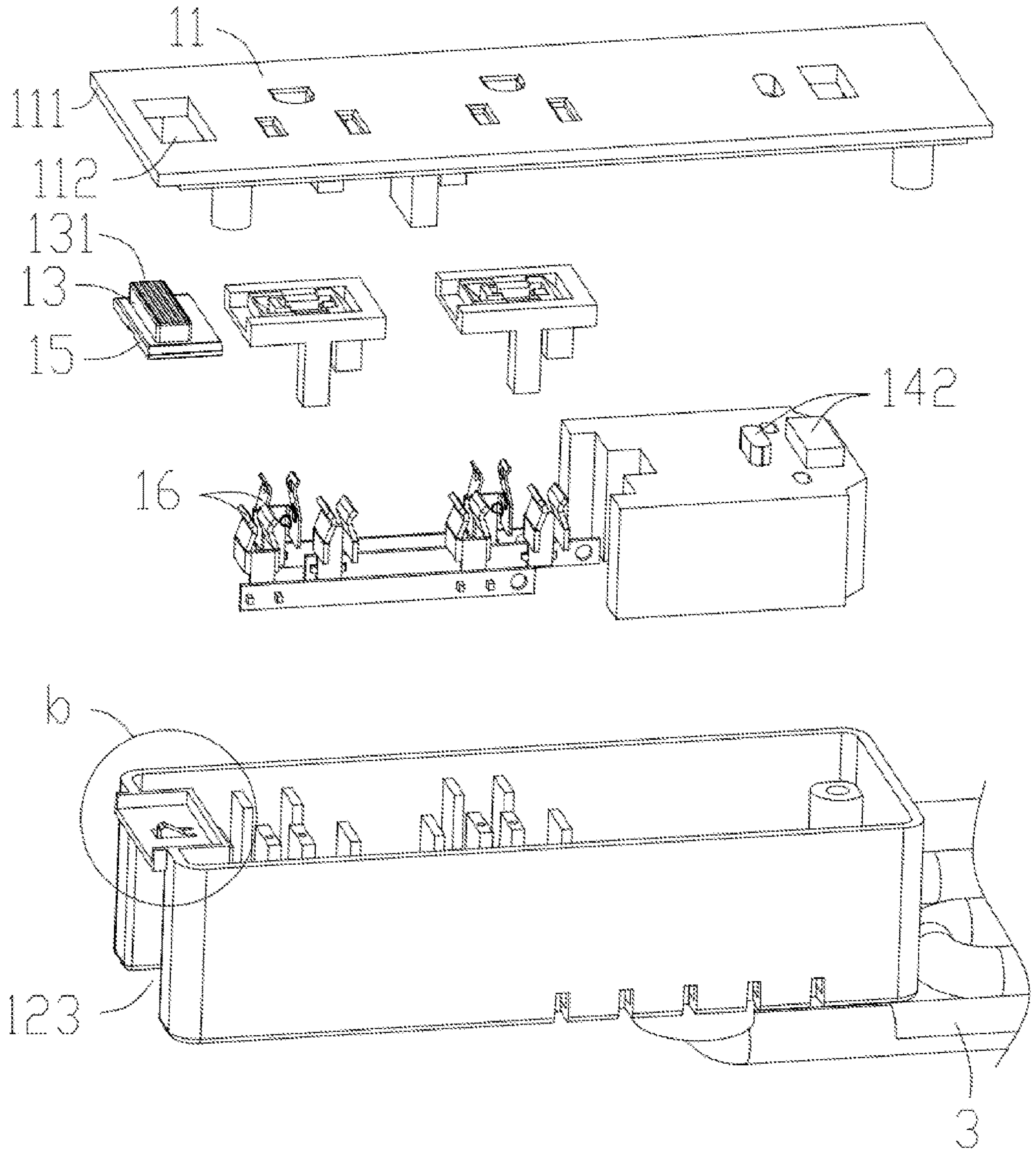
FIG. 7 is an exploded view of an extension socket body according to the present invention.
Figure 8:
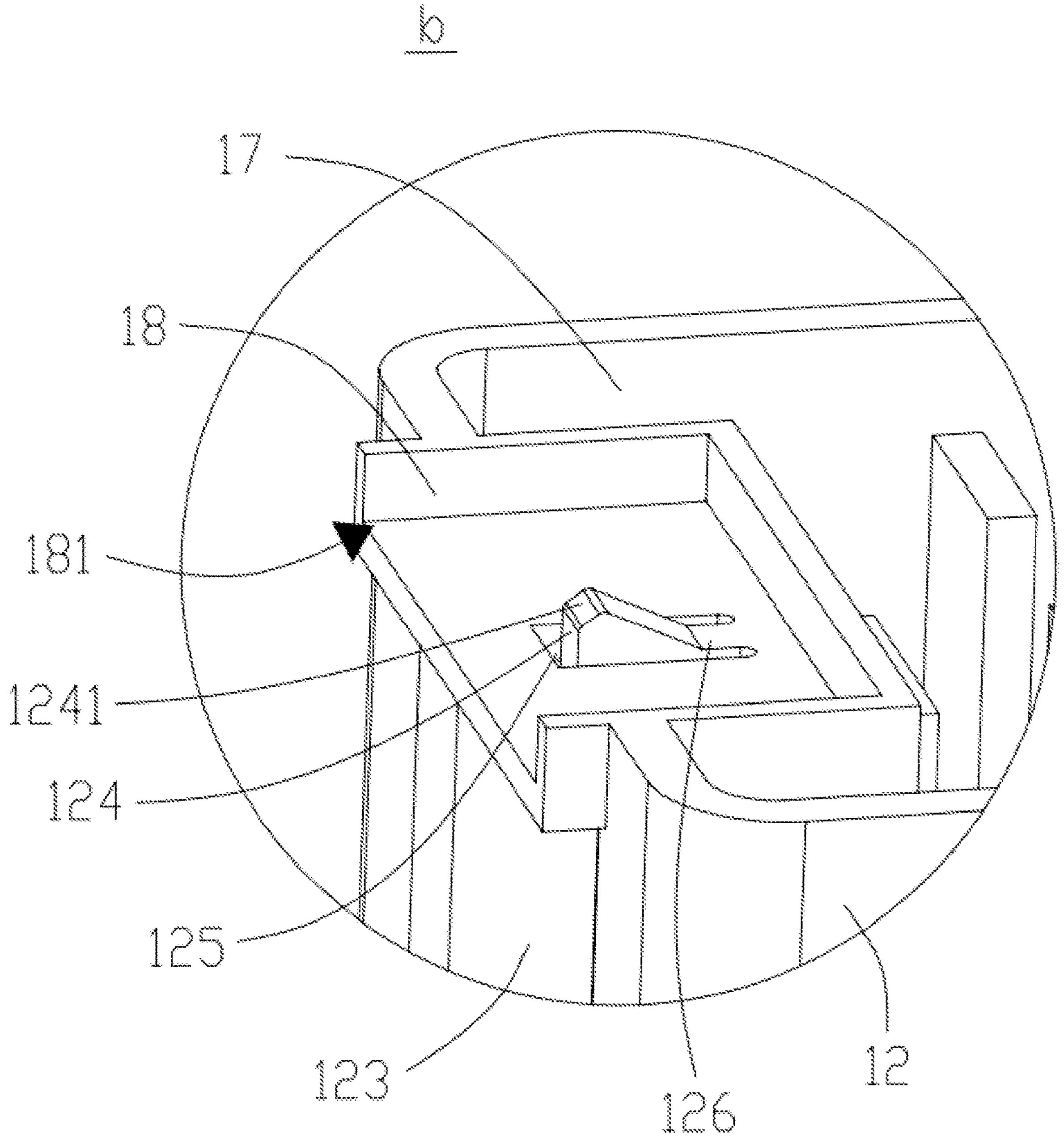
FIG. 8 is an enlarged view of area b in FIG. 7.
Figure 9:
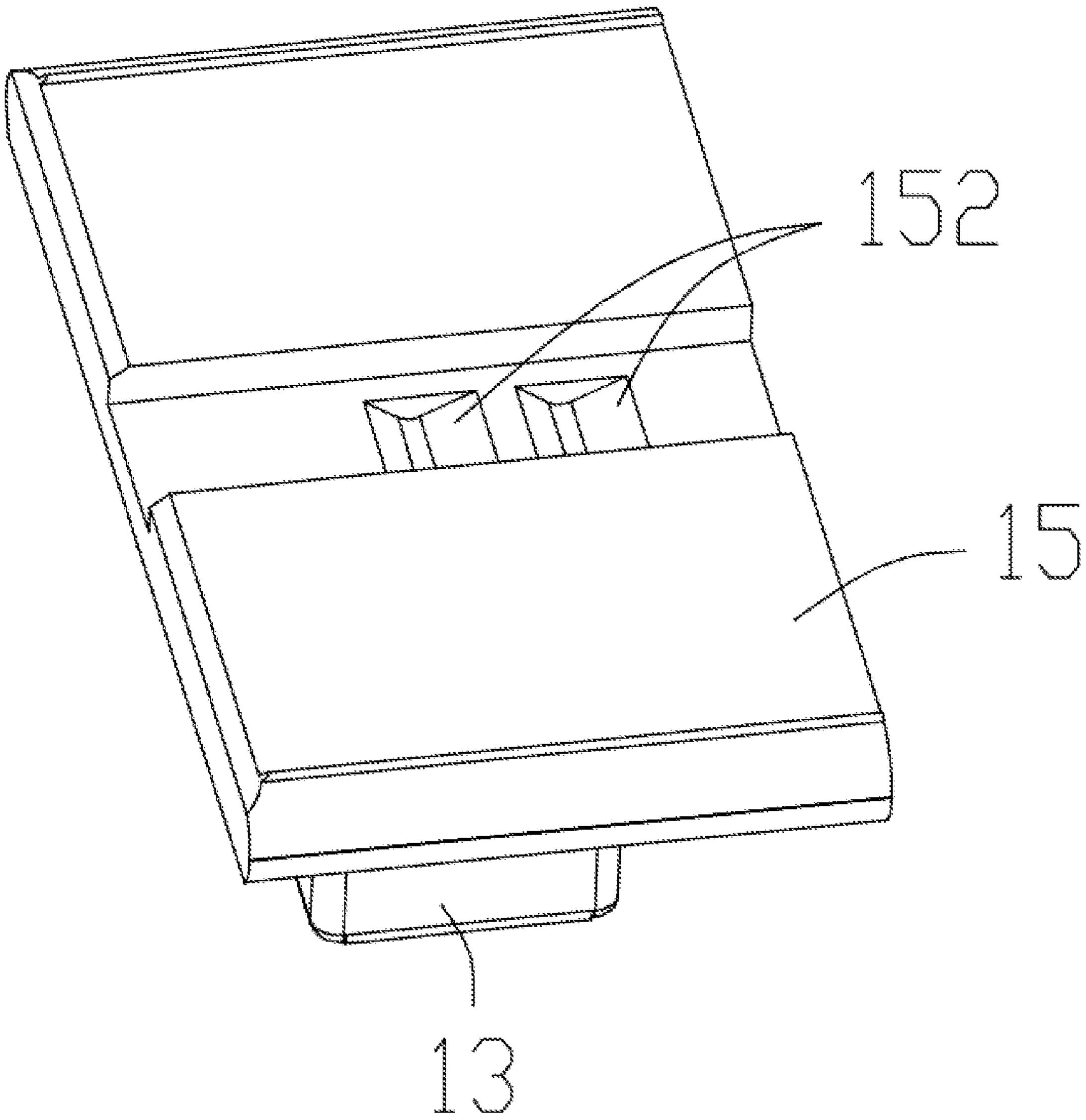
FIG. 9 is a structural diagram of a movable block according to the present invention.
Figure 10:
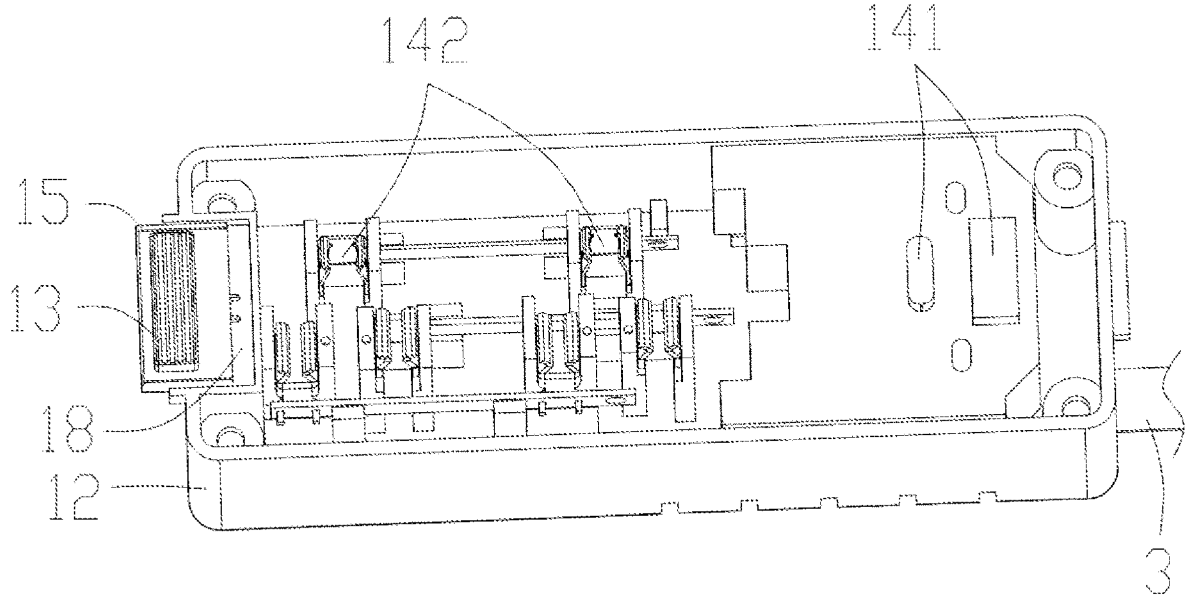
FIG. 10 is diagram of an internal structure of an extension socket body according to the present invention.

FIGS. 1-10 show a detachable extension socket assembly in embodiments of the present invention.

The detachable extension socket assembly includes an extension socket body 1 and a frame 2. The frame 2 is configured for fixing to an external component. A perforating hole 22 is provided on the frame 2, and a position limiting part 111 is arranged on the extension socket body 1. At least one part of the extension socket body 1 passes through the perforating hole 22, and the position limiting part 111 is used for abutting against the frame 2. The extension socket body 1 is detachably connected to the frame 2.

In the present invention, the frame 2 is configured for fixing to a table, and the extension socket body 1 is detachably connected to the frame 2. Therefore, when the extension socket body 1 is needed in other positions, the extension socket body 1 can be separated from the frame 2, so as to facilitate movement of the extension socket body 1, and solve the existing problems that installing the extension socket on a wooden table with screws can easily cause the table to crack around the screws and the installation is cumbersome. Moreover, by arranging the perforating hole 22 on the frame 2 for the extension socket body 1 to pass through, the extension socket body 1 can be embedded and installed on the external component.

It should be noted that the external component can be a table, a nightstand, a bracket, etc.

Specifically, in this embodiment, the frame 2 can be fixed to the external component by screws.

In one embodiment, a first convex block 121 is provided on one side wall of the extension socket body 1, and the extension socket body 1 is equipped with a buckle structure between one side or one end away from the first convex block 121 and the frame 2. When the extension socket body 1 is assembled with the frame 2, the extension socket body 1 is connected to the frame 2 through the buckle structure on the side or the end away from the first convex block 121, and the first convex block 121 is positioned at a bottom of the frame 2. That is, when the extension socket body 1 is assembled with the frame 2, the first convex block 121 can be first threaded through the perforating hole 22 and then placed at the bottom of the frame 2 to fix one end of the extension socket body 1. Then, the end of the extension socket body 1 away from the first convex block 121 can be connected and fixed to the frame 2 through the buckle structure, so that the extension socket body 1 is fixed to the frame 2. By configuring the first convex block 121, the structure is simple, avoiding the problem of increasing costs by using the buckle structure at both ends.

In one embodiment, to increase the stability of the first convex block 121, a reinforcing rib 122 is provided at a bottom of the first convex block 121, and one side of the reinforcing rib 122 is connected to a side wall of the extension socket body 1. The first convex block 121 is in a strip shape to increase a volume of the first convex block 121, thereby improving the stability of the connection between the extension socket body 1 and the frame 2.

Specifically, in the above embodiments, the buckle structure includes a movable block 15 movably arranged on the extension socket body 1. When the extension socket body 1 is assembled with the frame 2, the movable block 15 moves relative to the extension socket body 1 under the action of an external force, and at least one part of the movable block 15 is positioned below the frame 2. By utilizing the position limiting part 111 positioned above the frame 2, and in conjunction with the movable block 15 and the first convex block 121 positioned below the position limiting part 111, the extension socket body 1 can be fixed onto the frame 2.

Specifically, when the extension socket body 1 is assembled with the frame 2, a first position limiting opening 151 is defined between at least one part of the movable block 15 and the position limiting part 111. It should be understood that at least one part of the position limiting part 111 is opposite to the movable block 15. Part of the frame 2 is placed inside the first position limiting opening 151. By using the first position limiting opening 151 to limit a position of the frame 2, in conjunction with the first convex block 121, the extension socket body 1 is fixed.

In one embodiment, the first convex block 121 is positioned below the position limiting part 111, and a second position limiting opening 10 is defined between the first convex block 121 and the position limiting part 111. It should be understood that at least one part of the position limiting part 111 is arranged relative to the first convex block 121. When the extension socket body 1 is assembled with the frame 2, part of the frame 2 is placed inside the second position limiting opening 10. By using the second position limiting opening 10 to limit a position of the frame 2, in conjunction with the movable block 15, the extension socket body 1 is fixed.

In one embodiment, the extension socket body 1 is provided with an installation chamber 18 at one end away from the first convex block 121, and at least one part of the movable block 15 is movably arranged within the installation chamber 18. A joint structure is provided between a bottom surface of the installation chamber 18 and the movable block 15. The joint structure includes a second convex block 124 and a plurality of fixed slots 152 adapted to the second convex block 124 for use. The plurality of fixed slots 152 are distributed along a direction of movement of the movable block 15, and the fixed slots 152 are used in conjunction with the second convex block 124 during the movement of the movable block 15. By configuring the second convex block 124 to be used with the plurality of fixed slots 152, when the movable block 15 moves, a position limiting effect can be played on the movable block 15. Specifically, in this embodiment, a total number of the fixed slots 152 is two. When the movable block 15 is relative to the frame 2 to form the first position limiting opening 151, one fixed slot 152 is configured for limiting a position of the second convex block 124, and when the movable block 15 is not relative to the frame 2, another fixed slot 152 is configured for limiting the position of the second convex block 124. Of course, in other embodiments, the total number of the fixed slots 152 can also be three, four, etc., and the total number of card slots 151 is not limited here. In other embodiments, the total number of the second convex block 124 may be multiple, and the total number of the fixed slots 152 may be one or more.

In one embodiment, in order to facilitate the placement of the second convex block 124 inside the fixed slots 152, two opposite side walls of the second convex block 124 are both first inclined guiding surfaces 1241. The first inclined guiding surfaces 1241 are inclined planes or curved planes, or a combination of inclined planes and curved planes, etc. The second convex block 124 fits the fixed slots 152.

In the above embodiments, the second convex block 124 is positioned on a bottom surface of the installation chamber 18, and the fixed slots 152 are positioned at a bottom of the movable block 15. The bottom surface of the installation chamber 18 is equipped with a U-shaped gap 125, and an elastic sheet 126 is provided in a middle of the U-shaped gap 125. The second convex block 124 is positioned on the elastic sheet 126. By using the U-shaped gap 125, the elastic sheet 126 can be made elastic, so that the second convex block 124 can be placed in the fixed slots 152. In an optimal embodiment, in order to increase a range of upward and downward movement of the second convex block 124, the second convex block 124 is positioned at one end of the elastic sheet 126 away from the first convex block 121.

In one embodiment, the extension socket body 1 is provided with an avoidance opening 123 on a side wall corresponding to the elastic sheet 126, and the avoidance opening 123 is positioned below the elastic sheet 126.

Of course, in other embodiments, the second convex block 124 may also be positioned on a bottom surface of the installation chamber 18, and the fixed slots 152 may be positioned on the movable block 15.

In one embodiment, the installation chamber 18 is provided with a first opening 181 on one side away from the first convex block 121. An upper surface of the extension socket body 1 is provided with a second opening 112 in communication with the installation chamber 18. A top of the movable block 15 is provided with a toggle block 13, and the toggle block 13 is at least partially placed inside the first opening 181. By configuring the toggle block 13, users can move the movable block 15 by toggling the toggle block 13.

In one embodiment, at least one anti-slip groove 131 is provided at a top of the toggle block 13. The anti-slip groove 131 is capable of increasing the friction between the toggle block 13 and the users, so as to better toggle the toggle block 13.

In one embodiment, the position limiting part 111 is arranged around a peripheral side of the extension socket body 1. In other embodiments, a total number of the position limiting parts 111 can also be at least two, and at least two position limiting parts 111 are respectively positioned above the first convex block 121 and the movable block 15, so that when the position limiting parts 111 are used in conjunction with the buckle structure and the first convex block 121, the extension socket body 1 can be fixed onto the frame 2.

Specifically, in the above embodiments, in order to facilitate the production and manufacturing of the extension socket body 1, the extension socket body 1 includes a bottom shell 12 and a front shell 11. The installation chamber 18 and the first opening 181 are formed by connecting the bottom shell 12 to the front shell 11. The second opening 112 and the position limiting part 111 are both positioned on the front shell 11. The first convex block 121, the reinforcing rib 122, the elastic sheet 126, and the second convex block 124 are all positioned on the bottom shell 12.

In one embodiment, the first convex block 121, the reinforcing rib 122, the elastic sheet 126, the second convex block 124 and the bottom shell 12 are all integrally formed by injection molding, thereby reducing the steps of the production process, lowering production costs, and also improving the stability of the connection between the first convex block 121, the reinforcing rib 122 and the bottom shell 12.

In one embodiment, an upper surface of the frame 2 is provided with an accommodating slot 21 at a position corresponding to the position limiting part 111. When the extension socket body 1 is assembled with the frame 2, the position limiting part 111 is placed in the accommodating slot 21 to further limit a position of the extension socket body 1. Moreover, when a depth of the accommodating slot 21 is greater than or equal to a height of the position limiting part 111, it can ensure that the extension socket body 1 does not protrude from the frame 2, improving the cleanliness of the desktop.

In one embodiment, when the extension socket body 1 is assembled with the frame 2, an upper surface of the frame 2 and an upper surface of the extension socket body 1 are on an identical plane or in smooth transition to improve the aesthetics of the extension socket assembly in this embodiment.

In one embodiment, the extension socket body 1 is equipped with a plurality of jacks 14 for connecting to external devices. The jacks 14 can be three-hole jacks 142, two-hole jacks, USB interfaces 141, etc. The jacks 14 can be national standard jacks, American standard jacks, European standard jacks, British standard jacks, and other national standard jacks. The USB interfaces 141 can be USB-A interfaces, USB-C interfaces, lightning interfaces, Micro USB interfaces 141, etc. Manufacturers can configure the USB interfaces 141 according to users' needs. The type and quantity of the jacks 14 are not limited here.

In one embodiment, the jacks 14 include USB interfaces 141, three-hole jacks 142, and two-hole jacks. The extension socket body 1 further includes a power cord 3 and a plurality of electrical connection sheets 16 electrically connected to the power cord 3. One electrical connection sheet 16 is provided below each jack 14 on the three-hole jacks 142 and the two-hole jacks, and the power cord 3 is further electrically connected to the USB interfaces 141. A plug at an end of the power cord 3 is used for connecting to an external socket, so that the external input power can be transferred to the three-hole jacks 142, the two-hole jacks, and the USB interfaces 141. Therefore, when the three-hole jacks 142, the two-hole jacks, or the USB interfaces 141 are used, power is output for the use of required electrical appliance.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A detachable extension socket assembly, comprising an extension socket body and a frame, the frame being configured for fixing to an external component;

wherein a perforating hole is provided on the frame, and a position limiting part is arranged on the extension socket body; at least one part of the extension socket body passes through the perforating hole, the position limiting part is used for abutting against the frame, and the extension socket body is detachably connected to the frame;

wherein a first convex block is provided on one side wall of the extension socket body, and the extension socket body is equipped with a buckle structure between one side or one end away from the first convex block and the frame;

when the extension socket body is assembled with the frame, the extension socket body is connected to the frame through the buckle structure on the side or the end away from the first convex block, and the first convex block is positioned at a bottom of the frame;

wherein the buckle structure comprises a movable block movably arranged on the extension socket body;

when the extension socket body is assembled with the frame, the movable block moves relative to the extension socket body under the action of an external force, and at least one part of the movable block is positioned below the frame;

wherein when the extension socket body is assembled with the frame, a first position limiting opening is defined between at least one part of the movable block and the position limiting part, and part of the frame is placed inside the first position limiting opening;

wherein the first convex block is positioned below the position limiting part, and a second position limiting opening is defined between the first convex block and the position limiting part;

when the extension socket body is assembled with the frame, part of the frame is placed inside the second position limiting opening.

2. The detachable extension socket assembly of claim 1, wherein a reinforcing rib is provided at a bottom of the first convex block, and one side of the reinforcing rib is connected to a side wall of the extension socket body.

3. The detachable extension socket assembly of claim 2, wherein the extension socket body is provided with an installation chamber at one end away from the first convex block, at least one part of the movable block is arranged within the installation chamber, and a joint structure is provided between a bottom surface of the installation chamber and the movable block;

the joint structure comprises a second convex block and a plurality of fixed slots adapted to the second convex block for use, the plurality of fixed slots are distributed along a direction of movement of the movable block, and the fixed slots are used in conjunction with the second convex block during the movement of the movable block.

4. The detachable extension socket assembly of claim 3, wherein two opposite side walls of the second convex block are both first inclined guiding surfaces, the first inclined guiding surfaces are inclined planes or curved planes, and the second convex block fits the fixed slots.

5. The detachable extension socket assembly of claim 3, wherein the second convex block is positioned on a bottom surface of the installation chamber, and the fixed slots are positioned at a bottom of the movable block;

the bottom surface of the installation chamber is equipped with a U-shaped gap, an elastic sheet is provided in a middle of the U-shaped gap, and the second convex block is positioned on the elastic sheet.

6. The detachable extension socket assembly of claim 5, wherein the second convex block is positioned at one end of the elastic sheet away from the first convex block.

7. The detachable extension socket assembly of claim 5, wherein the installation chamber is provided with a first opening on one side away from the first convex block, an upper surface of the extension socket body is provided with a second opening in communication with the installation chamber, a top of the movable block is provided with a toggle block, and the toggle block is at least partially placed in the first opening.

8. The detachable extension socket assembly of claim 7, wherein at least one anti-slip groove is provided at a top of the toggle block.

9. The detachable extension socket assembly of claim 7, wherein the position limiting part is arranged around a peripheral side of the extension socket body.

10. The detachable extension socket assembly of claim 7, wherein a total number of the position limiting parts is at least two, and at least two position limiting parts are respectively positioned above the first convex block and the movable block.

11. The detachable extension socket assembly of claim 7, wherein the extension socket body comprises a bottom shell and a front shell, the installation chamber and the first opening are formed by connecting the bottom shell to the front shell, and the second opening and the position limiting part are both positioned on the front shell; the first convex block, the reinforcing rib, the elastic sheet, and the second convex block are all positioned on the bottom shell.

12. The detachable extension socket assembly of claim 11, wherein the first convex block, the reinforcing rib, the elastic sheet, the second convex block and the bottom shell are all integrally formed by injection molding.

13. The detachable extension socket assembly of claim 11, wherein an upper surface of the frame is provided with an accommodating slot at a position corresponding to the position limiting part, and when the extension socket body is assembled with the frame, the position limiting part is placed in the accommodating slot.

14. The detachable extension socket assembly of claim 13, wherein when the extension socket body is assembled with the frame, an upper surface of the frame and an upper surface of the extension socket body are on an identical plane or in smooth transition.

15. The detachable extension socket assembly of claim 11, wherein the extension socket body is equipped with a plurality of jacks for connecting to external devices; the jacks are three-hole jacks, two-hole jacks, and/or USB interfaces; the jacks are national standard jacks, American standard jacks, European standard jacks, and/or British standard jacks; the USB interfaces are USB-A interfaces, USB-C interfaces, lightning interfaces, and/or Micro USB interfaces.

16. The detachable extension socket assembly of claim 15, wherein the jacks comprise USB interfaces and three-hole jacks, the extension socket body further comprises a power cord and electrical connection sheets electrically connected to the power cord, the electrical connection sheets are arranged in positions corresponding to the three-hole jacks, and the power cord is also electrically connected to the USB interfaces.

17. A detachable extension socket assembly, comprising an extension socket body and a frame, the frame being configured for fixing to an external component;

wherein a perforating hole is provided on the frame, and a position limiting part is arranged on the extension socket body; at least one part of the extension socket body passes through the perforating hole, the position limiting part is used for abutting against the frame, and the extension socket body is detachably connected to the frame;

wherein a first convex block is provided on one side wall of the extension socket body, and the extension socket body is equipped with a buckle structure between one side or one end away from the first convex block and the frame;

when the extension socket body is assembled with the frame, the extension socket body is connected to the frame through the buckle structure on the side or the end away from the first convex block, and the first convex block is positioned at a bottom of the frame;

wherein the buckle structure comprises a movable block movably arranged on the extension socket body;

when the extension socket body is assembled with the frame, the movable block moves relative to the extension socket body under the action of an external force, and at least one part of the movable block is positioned below the frame;

wherein the extension socket body is provided with an installation chamber at one end away from the first convex block, at least one part of the movable block is arranged within the installation chamber;

wherein the installation chamber is provided with a first opening on one side away from the first convex block, an upper surface of the extension socket body is provided with a second opening in communication with the installation chamber, a top of the movable block is provided with a toggle block, and the toggle block is at least partially placed in the first opening.

18. The detachable extension socket assembly according to claim 17, wherein the toggle block is configured for driving the movable block to achieve a position limiting effect.

* * * * *